United States Patent
Krattiger et al.

(10) Patent No.: US 10,397,095 B2
(45) Date of Patent: Aug. 27, 2019

(54) DETECTING AND MITIGATING LOOPS

(71) Applicant: Cisco Technology, Inc., San Jose, CA (US)

(72) Inventors: Lukas Krattiger, Pleasanton, CA (US); Samir Thoria, Saratoga, CA (US); Manoj Kumar Pandey, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 15/396,873

(22) Filed: Jan. 3, 2017

(65) Prior Publication Data

US 2018/0191603 A1    Jul. 5, 2018

(51) Int. Cl.
*H04L 12/705* (2013.01)
*H04L 12/24* (2006.01)
*H04L 29/08* (2006.01)

(52) U.S. Cl.
CPC .......... *H04L 45/18* (2013.01); *H04L 41/0803* (2013.01); *H04L 41/14* (2013.01); *H04L 69/324* (2013.01); *Y02D 30/30* (2018.01)

(58) Field of Classification Search
CPC ...... H04L 45/18; H04L 41/0803; H04L 41/14
See application file for complete search history.

(56) References Cited

U.S. PATENT DOCUMENTS

| | | | |
|---|---|---|---|
| 2012/0027017 A1 | 2/2012 | Rai et al. | |
| 2013/0163596 A1* | 6/2013 | Zhang | H04L 45/18 370/392 |
| 2014/0007232 A1* | 1/2014 | Abidi | H04L 63/1483 726/22 |

FOREIGN PATENT DOCUMENTS

EP    1675320 A1    6/2006

OTHER PUBLICATIONS

Rajiv Asati Cisco Eli Dart ESNET: "IPv6 DAD Enhancements for Handling Layer1 Loopbacks; draft-asati-v6ops-dad-l000pback-00"; Internet Engineering Task Force, IETF; (ISOC) 4, Rue Des Falaises CH-1205, Geneva, Switzerland, Aug. 25, 2011, pp. 1-7, XP015077782, [retrieved on Aug. 25, 2011] (7 pgs.).
International Search Report and Written Opinion issued in PCT/US2017/068523 dated May 8, 2018, (16 pgs.).

* cited by examiner

*Primary Examiner* — Siming Liu
(74) *Attorney, Agent, or Firm* — Merchant & Gould P.C.

(57) ABSTRACT

Access-side loop mitigation may be provided. First, a first edge device may determine that a duplicate host exists on a network. Then the first edge device may detect a loop in response to determining that the duplicate host exists on the network. Detecting the loop may comprise sending a message on a plurality of access-side ports of the first edge device and then receiving, in response to sending the message on the plurality of access-side ports of the first edge device, a response on a first access-side port of the plurality of access-side ports of the first edge device. Next, the first edge device may mitigate the detected loop in response to receiving the response.

19 Claims, 5 Drawing Sheets

DETECTING AND MITIGATING LOOPS

TECHNICAL FIELD

The present disclosure relates generally to detecting and mitigating loops, in particular to detecting and mitigating loops in a network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
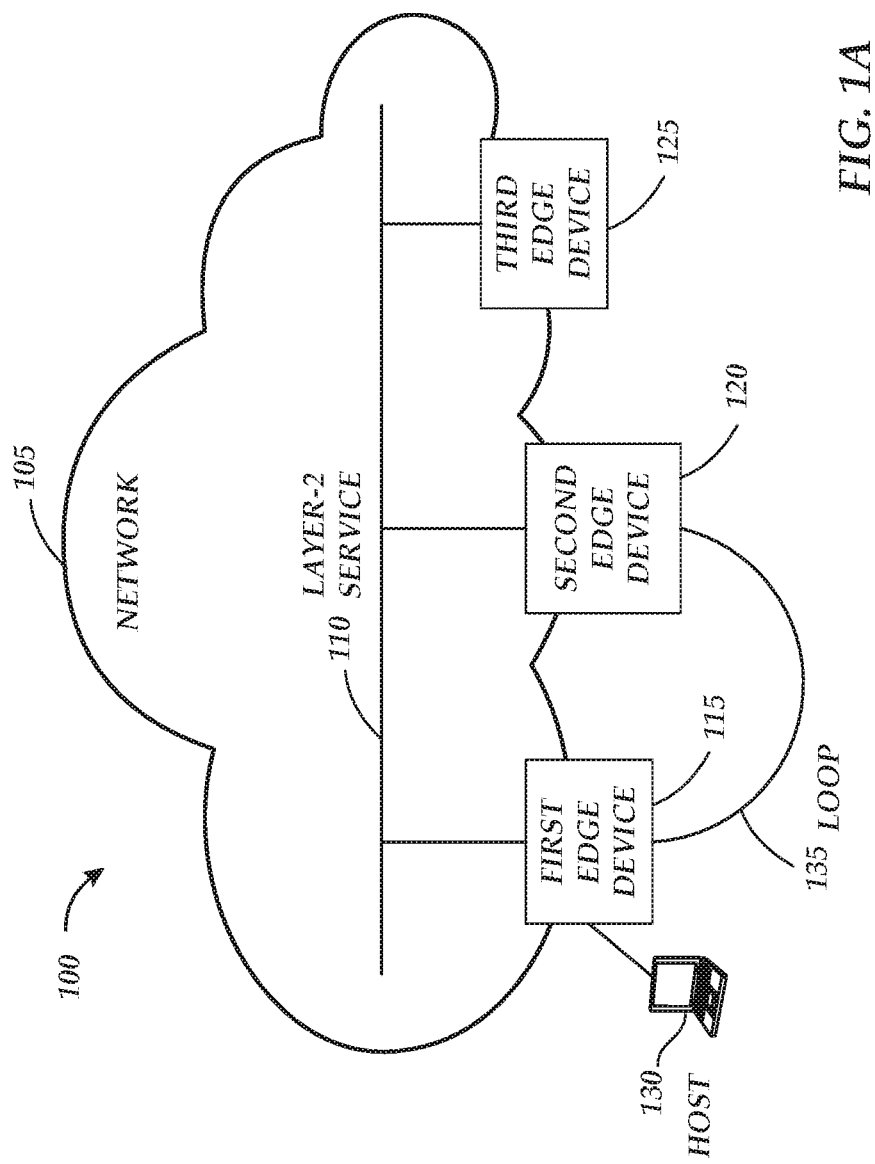
FIG. 1A, FIG. 1B, and FIG. 1C show a system for providing access-side loop detection and mitigation.

Access-side loop mitigation may be provided. First, a first edge device may determine that a duplicate host exists on a network. Then the first edge device may detect a loop in response to determining that the duplicate host exists on the network. Detecting the loop may comprise sending a message on a plurality of access-side ports of the first edge device and then receiving, in response to sending the message on the plurality of access-side ports of the first edge device, a response on a first access-side port of the plurality of access-side ports of the first edge device. Next, the first edge device may mitigate the detected loop in response to receiving the response.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A Layer-2 loop may occur through the extension of a Virtual Extensible Local Area Network (VXLAN) Layer-2 Service (VNI) with a Classic Ethernet segment (VLAN). Conventional Ethernet networks may use Spanning-Tree (STP) or Loop-Free topologies in order to prevent Layer-2 loops from happening. However, with the extension of Layer-2 across VXLAN overlay and the absence of a loop-detection across this extended bridge-domain (e.g., VLAN+VNI), VXLAN based networks may be exposed to service impact by the occurrence of loops.

With the addition of Ethernet Virtual Private Network (EVPN), not exclusively with VXLAN-EVPN in a Data Center, but as one of its major use-cases for example, it may be possible that a network operator may unintentionally create a loop on the conventional Ethernet access-side (i.e., "southbound"). This may occur, for example, by integrating a Spanning-Tree based Ethernet or with multi-homed links without the use of multi-homing. Accordingly, no fail-safe process may exist for VXLAN or EVPN to avoid Layer-2 loops being created by extending a Layer-2 overlay service in to the conventional Ethernet side (i.e., VLAN+VNI bridge-domain).

The presence of a loop may trigger both syslog-related alerts and routing-related behavior changes that may cause the network operator into misreading the real problem. Having a loop introduced through the access-side (i.e., southbound Ethernet) may be a difficult problem to diagnose because the loop may trigger the hosts to be "learned" on two (or more, if the loop spans multiple devices) interfaces or edge devices, which may lead to a spurious duplicate host state. In other words, a loop could look like a duplicate host is present because, due to the loop, the same host information (e.g., media access control (MAC) and/or internet protocol (IP) address) may show beyond different interfaces. Thus the same information is "flapping" between multiple locations. As a result, the network operator may potentially see a large number of duplicate host detection messages depending upon the number of hosts present in the loop. This may serve as an indication of potential trouble because the real cause of the large number of duplicate host detection messages may be the presence of a loop on the access-side, which may otherwise go potentially undetected. Not only could the duplicate detection syslog be inaccurate in terms of the real cause of the problem, but this could also trigger a host freeze and un-freeze process that may be associated with detection of duplicate hosts. Due to this, the network operator may see a large amount of churn in terms of the Border Gateway Protocol (BGP) periodically sending, for example, EVPN (RT-2) routes whenever the un-freeze happens. Furthermore, with freeze/un-freeze, the network operator may see routes for a given host doing a "flapping" between the two Interfaces or edge device that sit at the two ends of the loop.

FIG. 1A shows a system 100 consistent with embodiments of the disclosure for providing access-side loop detection and mitigation. As shown in FIG. 1A, system 100 may comprise a network 105 that may comprise, for example, a Virtual Extensible Local Area Network (VX- LAN). Network 105 may include a Layer-2 service 110, a first edge device 115, a second edge device 120, and a third edge device 125. First edge device 115, second edge device 120, and third edge device 125 may comprise, but are not limited to, switches and routers for example. First edge device 115, second edge device 120, and third edge device 125 may comprise VXLAN enabled switches, for example, VXLAN Tunnel Endpoints (VTEPs). A host 130 may be connected to network 105.

Figure 1B:
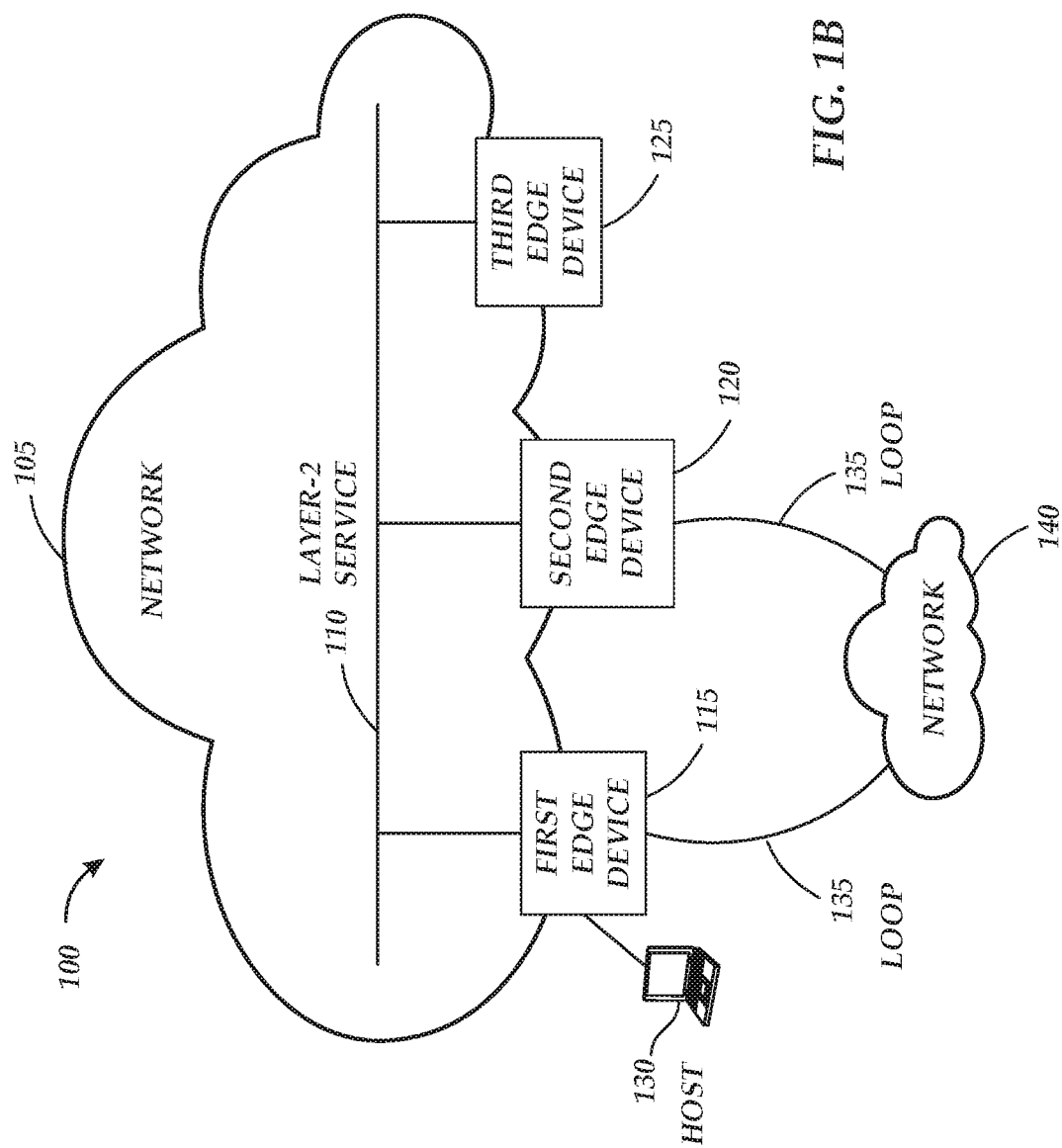
Figure 1C:
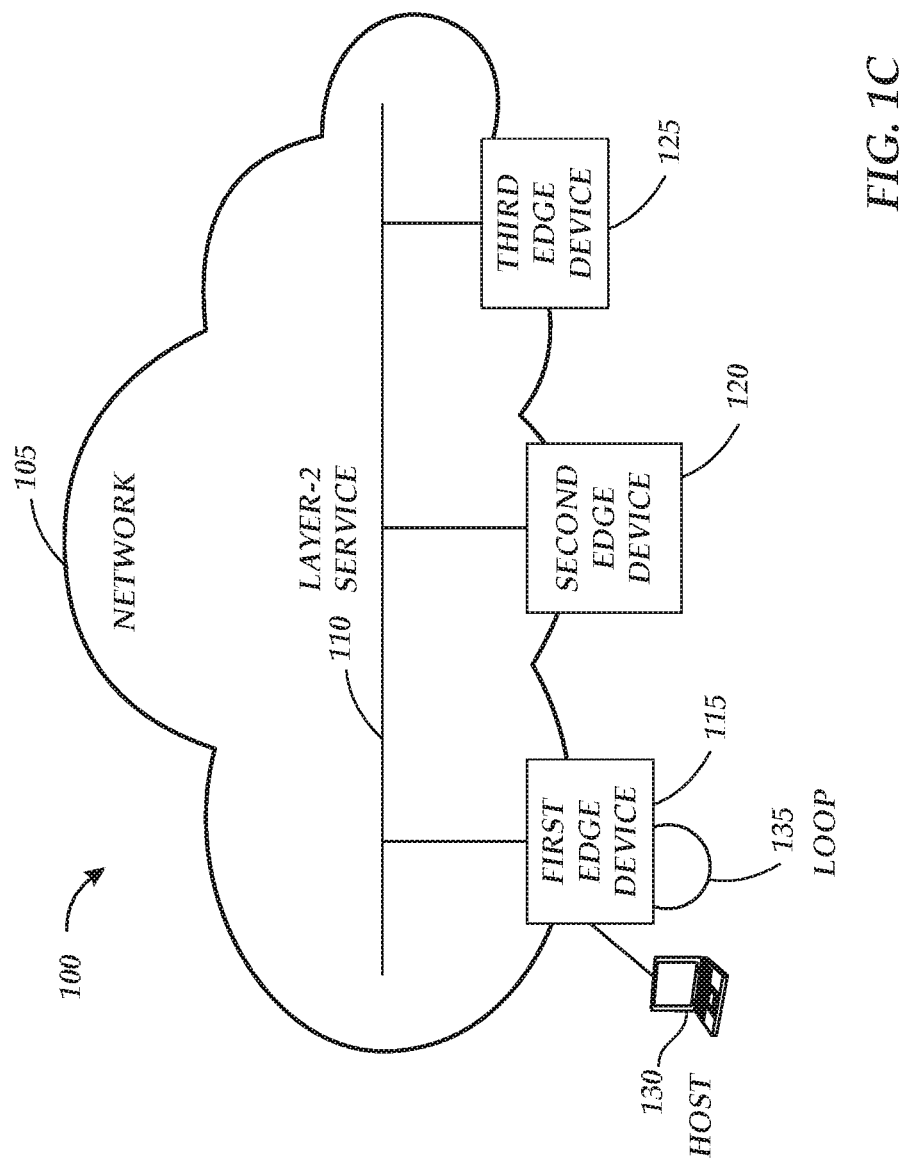

As shown in FIG. 1A, a loop 135 may exist between, for example, first edge device 115 and second edge device 120. FIG. 1B shows an example where loop 135 may occur through a southbound network 140 connected between first edge device 115 and second edge device 120. For example, southbound network 140 may comprise a Spanning Tree Protocol (STP) network connected to the southbound access-side ports of first edge device 115 and second edge device 120. Moreover, FIG. 1C shows an example where loop 135 may occur on the same edge device (e.g., first edge device) through different southbound access-side ports on the edge device.

Host 130 may be connected to network 105 through first edge device 115 over a wired or wireless connection. Any number of hosts similar to host 130 may be connect to first edge device 115, second edge device 120, and third edge device 125 on network 105. Host 130 may comprise any type of device wishing to communicate over network 105. For example, host 130 may comprise, but is not limited to, a Wi-Fi access point, a cellular base station, a tablet device, a mobile device, a smart phone, a telephone, a television, a remote control device, a set-top box, a digital video recorder, a cable modem, a personal computer, a network computer, a mainframe, a router, or other similar microcomputer-based device.

Network 105 may comprise a data center fabric for example. The data center fabric may comprise an underlay and an overlay. The underlay may deal with connectivity between data center fabric elements (e.g., network devices in network 105 including, but not limited to, first edge device 115, second edge device 120, and third edge device 125). The overlay may deal with user traffic entering the data center fabric, for example, from host 130. The user traffic may enter the data center fabric through data center fabric edge nodes (e.g., first edge device 115, second edge device 120, and third edge device 125). The data center fabric edge nodes may be responsible for encapsulating a packet with a data center fabric header that contains an egress data center fabric edge node address. When a packet (e.g., frame) arrives at the egress data center fabric edge node, a fabric header may be stripped off and the native packet may be forwarded according to an inner address. The data center fabric may be capable of providing Layer-2 and Layer-3 services on top of the underlay.

Consistent with embodiments of the disclosure, a control plane (e.g., in the overlay of the data center fabric) of network 105 may track the location of endpoints (i.e., hosts connected to the data center fabric). The end endpoints tracked by the control plane may include host 130 that may have an identifier, for example, a media access control (MAC) address, an internet protocol (IP) (e.g., IPv4 or IPv6) address, or any other identifier for the client device connected to the data center fabric.

When connected to first edge device 115, the identifier of host 130 (e.g., MAC address, IP address, or both) may be announced to the control plane as being connected to first edge device 115 (e.g., via VLAN from first edge device 115). Accordingly, the control plane may record in its database an indication that host 130 (e.g., identified by its identifier) is connected to first edge device 115. However, because loop 135 may exist between at least one access-side port of first edge device 115 and at least one access-side port of second edge device 120, the identifier of host 130 (e.g., MAC address, IP address, or both) may also be announced to the control plane as being connected to second edge device 120 (e.g., via Ethernet from second edge device 120). As a consequence, the control plane may update its database indicating host 130 is connected to second edge device 120 and not first edge device 115. Latter, the identifier of host 130 may be announced to the control plane as being connected to first edge device 115 (e.g., via VLAN from first edge device 115). Consequently, the control plane may update its database indicating host 130 is connected to first edge device 120 and not second edge device 120. This "flapping" of host 130 between first edge device 115 and second edge device 120 in the control plane records may continue to repeatedly occur. When detected, this flapping may be referred to as duplicate host detection (i.e., or determining that a duplicate host exists on network 105 for example). Embodiments of the disclosure, triggered by duplicate host detection, may then detect loop 135 and mitigate loop 135 as described in greater detail below.

Figure 2:
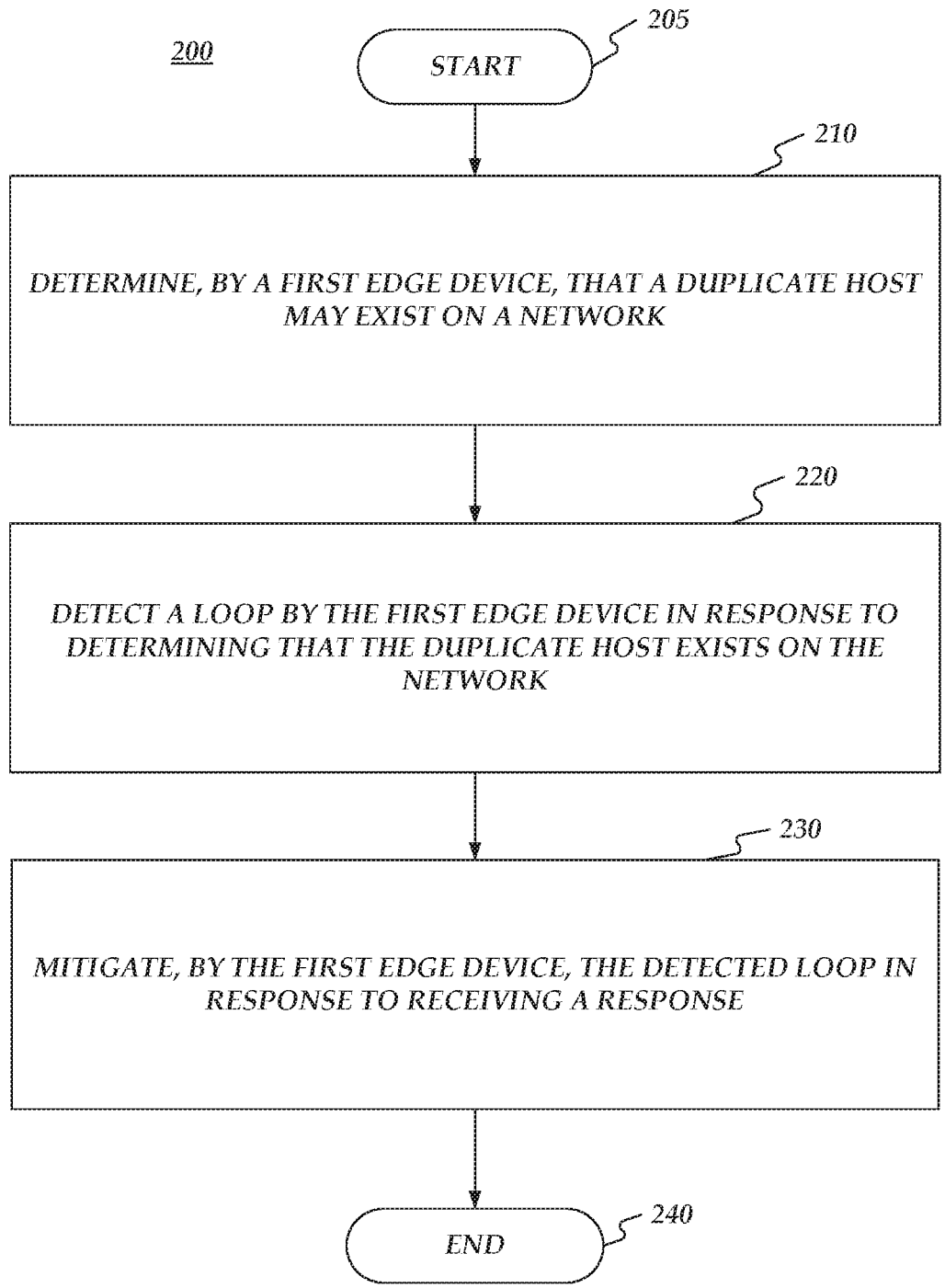
FIG. 2 is a flow chart of a method for providing access-side loop detection and mitigation.

FIG. 2 is a flow chart setting forth the general stages involved in a method 200 consistent with embodiments of the disclosure for providing access-side loop mitigation. Method 200 may be implemented using first edge device 115 as described in more detail above with respect to FIG. 1A, FIG. 1B, and FIG. 1C. Ways to implement the stages of method 200 may be described in greater detail below.

Method 200 may begin at starting block 205 and proceed to stage 210 where first edge device 115 may determine that a duplicate host exists on network 105. For example, when detected, the above described flapping may be referred to as duplicate host detection (i.e., determining that a duplicate host exists on network 105 for example). In other words, one indication that a southbound loop may exist on network 105 may be that host 130, sitting on loop 135, may get "learned" by the control plane of network 105 on both ends (e.g., first edge device 115 and second edge device 120) of loop 135. Accordingly, host 130 may be detected as a duplicate host on either edge devices. The presence of a duplicate host may be an indication of a loop, but not necessarily vice-versa. Thus, if an edge device (e.g., first edge device) determines that for a given VLAN (Bridge), it has a duplicate host (e.g., host 130), it then that edge device may trigger a loop-detection process as described below.

Consistent with embodiments of the disclosure, both sides of loop 135 may not simultaneously detect loop 135 and may not simultaneously mitigate loop 135 (e.g., bring down a port or VLAN). This is because, in the duplicate host detection process, only one of the two edge devices (e.g., first edge device 115 or second edge device 120) may freeze updates to the control plane. For example, whichever edge device (e.g., first edge device 115 or second edge device 120) that reaches K moves of host 130 in N seconds in the flapping process first, may declare that host 130 is a duplicate host and may freeze any further updates to the control plane of network 105. For example, if first edge device 115 reached a predetermined number of K moves of host 130 in a predetermined number of N seconds in the flapping process first, then second edge device 120 may continue to determine that host 130 is local to second edge device 120. In this case, first edge device 115 may trigger loop detection and block a port or shut a VLAN as described below, while second edge device 120 may continue to function without getting into the loop detection process.

From stage 210, where first edge device 115 determines that the duplicate host exists on network 105, method 200 may advance to stage 220 where first edge device 115 may detect loop 135 in response to determining that the duplicate host exists on network 105. For example, in detecting loop 135, first edge device 115 may send a message (e.g., a HELLO message) on a plurality of access-side ports (e.g., southbound) of first edge device 115. The message may be sent on a per-VLAN base where the loop (i.e., duplicate host) has been detected. If there are multiple VLANs, embodiments of the disclosure may send the message in the multiple VLANs. In response to sending the message, first edge device 115 may receive a response (e.g., a HELLO-RESPONSE) on a first access-side port of the plurality of access-side ports of first edge device 115. This response may come from second edge device 120 because second edge device 120 may be at the other end of loop 135.

The aforementioned process for detecting loop 135 on the access-side of the edge devices (e.g., first edge device 115, second edge device 120, and third edge device 125) of network 105 may be built on top of Link Layer Discovery Protocol (LLDP) or other technologies that allow sending a message to a plurality of devices. Loop 135 may be detected by adding a new Type-Length-Value (TLV) in a LLDP message. For example, the TLV may have flags to indicate a message type. In the above example, this may comprise a HELLO and HELLOR-RESPONSE. A device that initiates the loop detection (e.g., first edge device 115) may send an LLDP message on the access-side ports of first edge device 115 and may add this TLV with HELLO flag set. If any other edge device (e.g., second edge device 120) receives this LLDP message with HELLO flag, then it may send a response by setting the HELLO-RESPONSE. Once the sending device (e.g., first edge device 115) receives the HELLO-RESPONSE, then this may confirm the presence of loop 135 to first edge device 115. This HELLO and HELLO-RESPONSE message may also allow detection of loops created by unidirectional links and may relax the need of additional failure-detection methods like UDLD or STP bridge assurance.

Once loop 135 is detected, consistent with embodiments of the disclosure, network 105 (e.g., first edge device 115) may provide a more detailed message to devices on network 105 regarding detected loop 135 with, for example, the following loop-related parameters: i) a VLAN ID (Bridge ID) corresponding to loop 135; ii) an ID of a local port on first edge device to which loop 135 is connected (i.e., the ID of the first access-side port of the plurality of access-side ports of first edge device 115); iii) the remote device (e.g., second edge device) where loop 135 is; and iv) a port on the remote device (e.g., second edge device) where loop 135 is. When this more detailed message is sent, embodiments of the disclosure may suppress any further host duplicate-detection messages associated with that port/VLAN/remote device.

Once first edge device 115 detects loop 135 in response to determining that the duplicate host exists on network 105 in stage 220, method 200 may continue to stage 230 where first edge device 115 may mitigate detected loop 135 in response to receiving the response. For example, once loop 135 has been detected, the device (e.g., first edge device 115) that detected loop 135 may block the port on first edge device 115 to which loop 135 is connected (e.g., the first access-side port of the plurality of access-side ports of first edge device 115) or shut down the VLAN (Bridge) corresponding to loop 135.

Consistent with embodiments of the disclosure, the reason for blocking a port may be because in some use cases, the same VLAN may also be configured on other ports and those ports may not have a loop. Hence shutting down the VLAN may not be the right course of action. There may also be cases where a port is being used as an access port that carries more than one VLAN. For such a case, shutting down the VLAN may be the right course of action since that may allow other traffic on other VLANs to continue. To handle both of these, embodiments of the disclosure may provide a configuration option so that the network operator may indicate if blocking a port or shutting down a VLAN is the right thing to do for a given topology of network 105. In addition, embodiments of the disclosure may provide another syslog stating that network 105 has successfully blocked the port/shut the VLAN. Regardless, a syslog/trap for loop detection may be generated. Once first edge device 115 mitigates detected loop 135 in response to receiving the response in stage 240, method 200 may then end at stage 240.

Moreover, embodiments of the disclosure may provide a recovery process once loop 135 has been fixed (e.g., eliminated) by the network operator. Consistent with embodiments of the disclosure, the edge device (e.g., first edge device 135) that blocked the port/VLAN may send the same LLDP TLV with HELLO Flag after a certain time (configurable) has expired. If loop 135 has been fixed, then first edge device 135 may not get the HELLO-RESPONSE message. If a predetermined number of such continuous HELLO messages fail to receive a corresponding HELLO-RESPONSE message, then first edge device 135 may determine that loop 135 no longer exists and may unblock the port or un-shut the corresponding VLAN.

Figure 3:
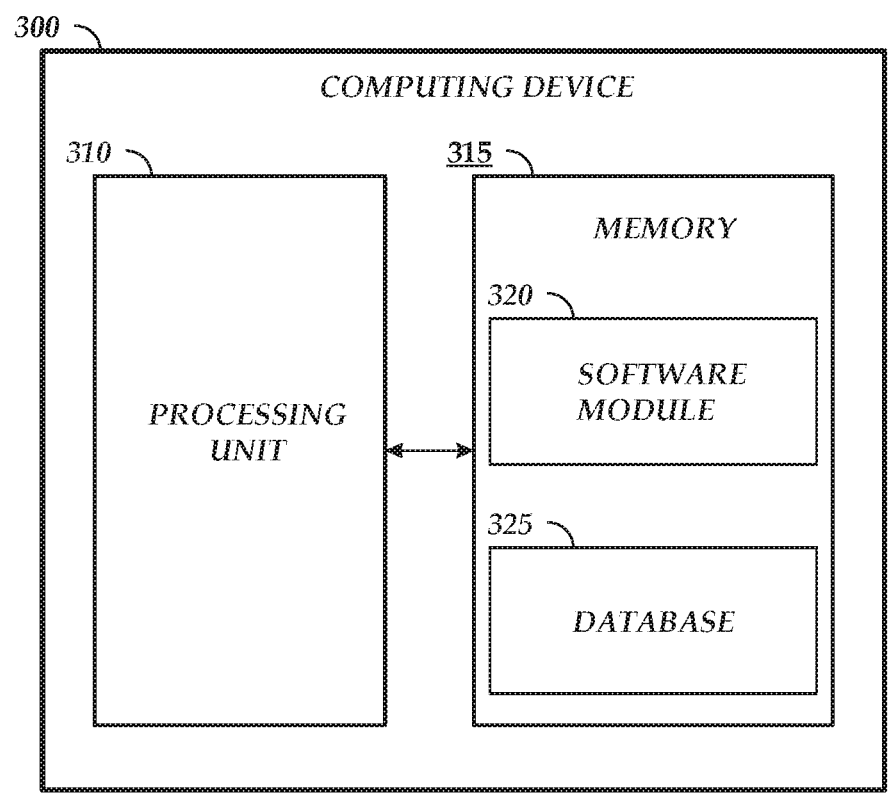
FIG. 3 shows a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing access-side loop mitigation, including for example, any one or more of the stages from method 200 described above with respect to FIG. 2. Computing device 300, for example, may provide an operating environment for first edge device 115, second edge device 120, third edge device 125, or host 130. First edge device 115, second edge device 120, third edge device 125, or host 130 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a television, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1A, FIG. 1B, and FIG. 1C may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a first edge device, that a duplicate host exists on a network between the first edge device and a second edge device;
   detecting, by the first edge device in response to determining that the duplicate host exists on the network between the first edge device and a second edge device, a loop, wherein detecting the loop comprises,
   sending a message on a plurality of access-side ports of the first edge device, and
   receiving, in response to sending the message on the plurality of access-side ports of the first edge device, a response on a first access-side port of the plurality of access-side ports of the first edge device; and
   mitigating, by the first edge device, the detected loop in response to receiving the response.

2. The method of claim 1, wherein determining that the duplicate host exists on the network between the first edge device and the second edge device comprises determining that a host has been announced to a control plane of the network as moving between the first edge device and the second edge device a predetermined number of times within a predetermined amount of time.

3. The method of claim 1, further comprising sending, in response to detecting the loop, a message on the network comprising at least one of the following: an identification of the second edge device and a port on the second edge device corresponding to the detected loop.

4. The method of claim 1, wherein sending the message comprises sending the message comprising a Link Layer Discovery Protocol (LLDP) message.

5. The method of claim 1, wherein sending the message comprises sending the message comprising a Link Layer Discovery Protocol (LLDP) message with a Type-Length-Value (TLV) added with a hello flag set.

6. The method of claim 5, wherein receiving the response comprises receiving the response comprising a hello-response to the Link Layer Discovery Protocol (LLDP) message with the Type-Length-Value (TLV) added with the hello flag set.

7. The method of claim 1, further comprising sending, in response to detecting the loop, a message on the network comprising at least one of the following: a virtual local area network (VLAN) identification corresponding to the detected loop and an identification of the first access-side port.

8. The method of claim 1, wherein mitigating the detected loop comprises, in response to receiving the response, bringing down, by the first edge device, the first access-side port of the plurality of access-side ports of the first edge device.

9. The method of claim 8, further comprising bring back up the first access-side port of the plurality of access-side ports of the first edge device when no further response is received from a second edge device in response to sending a further message to at least the first access-side port.

10. The method of claim 1, wherein mitigating the detected loop comprises, in response to receiving the response, bringing down, by the first edge device, a virtual local area network (VLAN) corresponding to the detected loop.

11. The method of claim 10, further comprising bring back up the virtual local area network (VLAN) corresponding to the detected loop when no further response is received from a second edge device in response to sending a further message to at least the first access-side port.

12. A method comprising:
determining, by a first edge device, that a duplicate host exists on a network between the first edge device and a second edge device;
detecting, by the first edge device in response to determining that the duplicate host exists on the network, a loop, wherein detecting the loop comprises,
sending a message on a plurality of access-side ports of the first edge device, and
receiving, in response to sending the message on the plurality of access-side ports of the first edge device, a response on a first access-side port of the plurality of access-side ports of the first edge device;
mitigating, by the first edge device, the detected loop in response to receiving the response, wherein mitigating the detected loop comprises, in response to receiving the response, bringing down, by the first edge device, the first access-side port of the plurality of access-side ports of the first edge device; and
bring back up the first access-side port of the plurality of access-side ports of the first edge device when no further response is received from a second edge device in response to sending a further message to at least the first access-side port.

13. The method of claim 12, wherein determining that the duplicate host exists on the network between the first edge device and the second edge device comprises determining that a host has been announced to a control plane of the network as moving between the first edge device and the second edge device a predetermined number of times within a predetermined amount of time.

14. The method of claim 12, wherein sending the message comprises sending the message comprising a Link Layer Discovery Protocol (LLDP) message.

15. The method of claim 12, wherein sending the message comprises sending the message comprising a Link Layer Discovery Protocol (LLDP) message with a Type-Length-Value (TLV) added with a hello flag set.

16. An apparatus comprising:
a memory storage; and
a processing unit coupled to the memory storage, wherein the processing unit is operative to:
determine that a duplicate host exists on a network between a first edge device and a second edge device;
detect in response to determining that the duplicate host exists on the network between the first edge device and a second edge device, a loop, wherein the processing unit being operative to detect the loop comprises the processing unit being operative to,
send a message on a plurality of access-side ports of the apparatus, and
receive, in response to sending the message, a response on a first access-side port of the plurality of access-side ports; and
mitigate the detected loop in response to receiving the response.

17. The apparatus of claim 16, wherein the processing unit being operative to send the message comprises the processing unit being operative to send the message comprising a Link Layer Discovery Protocol (LLDP) message.

18. The apparatus of claim 16, wherein the processing unit being operative to send the message comprises the processing unit being operative to send the message comprising a Link Layer Discovery Protocol (LLDP) message with a Type-Length-Value (TLV) added with a hello flag set.

19. The apparatus of claim 16, wherein the processing unit being operative to receive the response comprises the processing unit being operative to receive the response comprising a hello-response to the Link Layer Discovery Protocol (LLDP) message with the Type-Length-Value (TLV) added with the hello flag set.

* * * * *